UNITED STATES PATENT OFFICE.

COLUMBUS SCRIBER, OF WASHINGTON, DISTRICT OF COLUMBIA.

IMPROVEMENT IN CONCRETE PAVEMENTS.

Specification forming part of Letters Patent No. 127,190, dated May 28, 1872.

*To all whom it may concern:*

Be it known that I, COLUMBUS SCRIBER, of the city of Washington, District of Columbia, have invented a new and Improved Concrete for Pavements and other purposes; and I do hereby declare that the following is a full, clear, and exact description thereof.

This invention relates to a new and improved process of combining or mixing certain substances hereinafter explained, for the purpose of making floors, pavements, and wainscoting for walls, whereby a concrete is obtained which is exceedingly durable, which is water-proof, and which will not be softened by solar temperature, as will be hereinafter explained.

The ingredients which enter into my composition are as follows: Sharp, dry sand, or, in lieu thereof, dry pulverized stone of any kind, may be used; resin of the first or second quality; pine tar.

To prepare the concrete of the above-named substances I take, say twenty-four hundred pounds of the sand, or twenty-two hundred pounds of the pulverized stone, and mix with it pounded and sifted resin, say about six hundred pounds if of the second quality, or fifty pounds less if of the first quality. These substances are put into a suitable vessel over a furnace and heated, and while they are being thus treated I slowly add the pine tar and keep stirring all the time. About three hundred and eighty-four pounds of the tar are added to the above, and the composition heated for about two hours, more or less, according to the intended use of the concrete. For outside work, such as pavements and sidewalks exposed to the sun, the composition will require to be heated for a longer time than where it is intended for inside work not so exposed. This composition while soft is spread evenly upon the surface to be covered, and smoothed with a trowel or hot iron. The hot iron is used to burn the tar and resin which rise to the surface, and also to prepare the surface for "top dressing with pounded stone of any kind and color. The hot iron will draw out of the concrete a sufficient amount of the tar and resin to form a cement agglutinating the top dressing, and causing it to firmly adhere to the layer beneath.

The hot iron above referred to is constructed with one rounded side and end, the other side and end having square edges. After sifting on the powdered stone or sand for the top dressing a smooth surface or finish is obtained by rubbing the surface with a wooden "float."

It will be seen from the above description that I am enabled to construct a pavement which will present all the appearance of any kind of stone used for the "top dressing," such, for instance, as marble, blue-stone, and any other stone which it may be desired to employ.

The concrete may be molded in blocks or slabs of any desired shape or size, and laid down in the usual manner of setting stone slabs.

The concrete can also be employed as a plaster for wainscoting walls, and may be ornamented by coloring and polishing it.

Having described my invention, what I claim as new, and desire to secure by Letters Patent, is—

1. A concrete, composed of the within-described ingredients mixed together in about the proportions set forth.

2. The process of mixing together the said ingredients and applying a top dressing of powdered stone, substantially as described.

COLUMBUS SCRIBER.

Witnesses:
Z. N. CAMPBELL,
JAMES MARTIN, Jr.